(12) United States Patent
Dwelle

(10) Patent No.: US 7,860,135 B2
(45) Date of Patent: Dec. 28, 2010

(54) LOW LOSS CRYSTAL AS A LARGE APERTURE AO DEFLECTOR

(75) Inventor: Ronald C. Dwelle, Sunnyvale, CA (US)

(73) Assignee: Crystal Technologies, Inc., Palo Alto, CA (US)

( * ) Notice: Subject to any disclaimer, the term of this patent is extended or adjusted under 35 U.S.C. 154(b) by 32 days.

(21) Appl. No.: 12/391,539

(22) Filed: Feb. 24, 2009

(65) Prior Publication Data
US 2010/0215064 A1    Aug. 26, 2010

(51) Int. Cl.
*H01S 3/11* (2006.01)
*G02F 1/11* (2006.01)

(52) U.S. Cl. .......................... 372/10; 359/285; 359/286

(58) Field of Classification Search .................... 372/10; 359/285–286
See application file for complete search history.

(56) References Cited

U.S. PATENT DOCUMENTS

| 3,851,951 A * | 12/1974 | Eveleth ....................... 359/286 |
| 2004/0264517 A1* | 12/2004 | Sun et al. ....................... 372/26 |

\* cited by examiner

*Primary Examiner*—Tod T Van Roy
*Assistant Examiner*—Patrick Stafford
(74) *Attorney, Agent, or Firm*—Paul Davis; Goodwin Procter LLP

(57) ABSTRACT

An acousto-optic deflector includes a body of material through which a laser beam to be modulated passes. The material has an acoustic attenuation in the range of 0.15 to 1.0 dB/$\mu$s-GHz$^2$ and operates in a UV range of about 150 to 400 nm. A transducer is bonded to the body of material to launch a wave. An electronic driver drives the transducer.

27 Claims, 3 Drawing Sheets

LOW LOSS CRYSTAL AS A LARGE APERTURE AO DEFLECTOR

BACKGROUND

1. Field of the Invention

This invention relates generally to, AO deflectors, and more particularly to a low loss crystal as a large aperture AO deflector.

2. Description of the Related Art

An Acousto-Optic traveling lens scanner utilizes a frequency modulated acoustic wave packet to focus a diffracted laser beam. The focus power is determined by the rate of change of acousto-optic diffraction angles across the wave packet. The acoustic wave packet is typically short relative to the full optical aperture of the Acousto-optic device. The focused spot scans as the acoustic packet travels across the device aperture at a speed determined by the velocity of the acoustic wave packet. Therefore the optical scan velocity is equivalent to the acoustic packet propagation velocity. In this mode of operation, much higher scanning data rates can be achieved than with other Acousto-Optic or mechanical scanning methods (VanderLugt and Bardos).

An Acousto-Optic traveling lens system comprises a laser producing a collimated laser beam, a beam expander, an Acousto-Optic bragg cell with a piezoelectric transducer (the traveling lens device), a chirped pulse RF frequency synthesizer, Cylindrical scan optics. In the preferred embodiment, there is an orthogonal axis scan mechanism, either steering the laser beam or mechanically translating the substrate with respect to the scanning mechanism. That way, the focal spot scans across a two-dimensional surface, the "optical scan plane".

This system may also include an Acousto-Optic tracker to increase the optical efficiency, as disclosed in U.S. Pat. No. 3,851,951 hereafter the ("'951 Patent").

In the '951 Patent, a preliminary Bragg deflector is used so that not the whole cell with the traveling lens needs to be illuminated, but only the lens itself. This improves light efficiency from laser to focused spot. As the wave packet reaches the end of the aperture, the tracker cell needs to redirect the light to the next pulse at the transducer end of the traveling lens device. The faster this flyback time, the less dead-time the system has. Using Sapphire for the tracker Bragg cell makes this fast because the speed of sound is high.

SUMMARY

An object of the present invention is to provide improved AO deflectors.

Another object of the present invention is to provide a low loss crystal as a large aperture AO deflector.

These and other objects of the present invention are achieved in, an acousto-optic deflector that includes a body of material through which a laser beam to be modulated passes. The material has an acoustic attenuation in the range of 0.15 to 1.0 dB/µs-GHz$^2$ and operates in a UV range of about 150 to 400 nm. A transducer is bonded to the body of material to launch a wave. An electronic driver drives the transducer.

DETAILED DESCRIPTION

Figure 1:
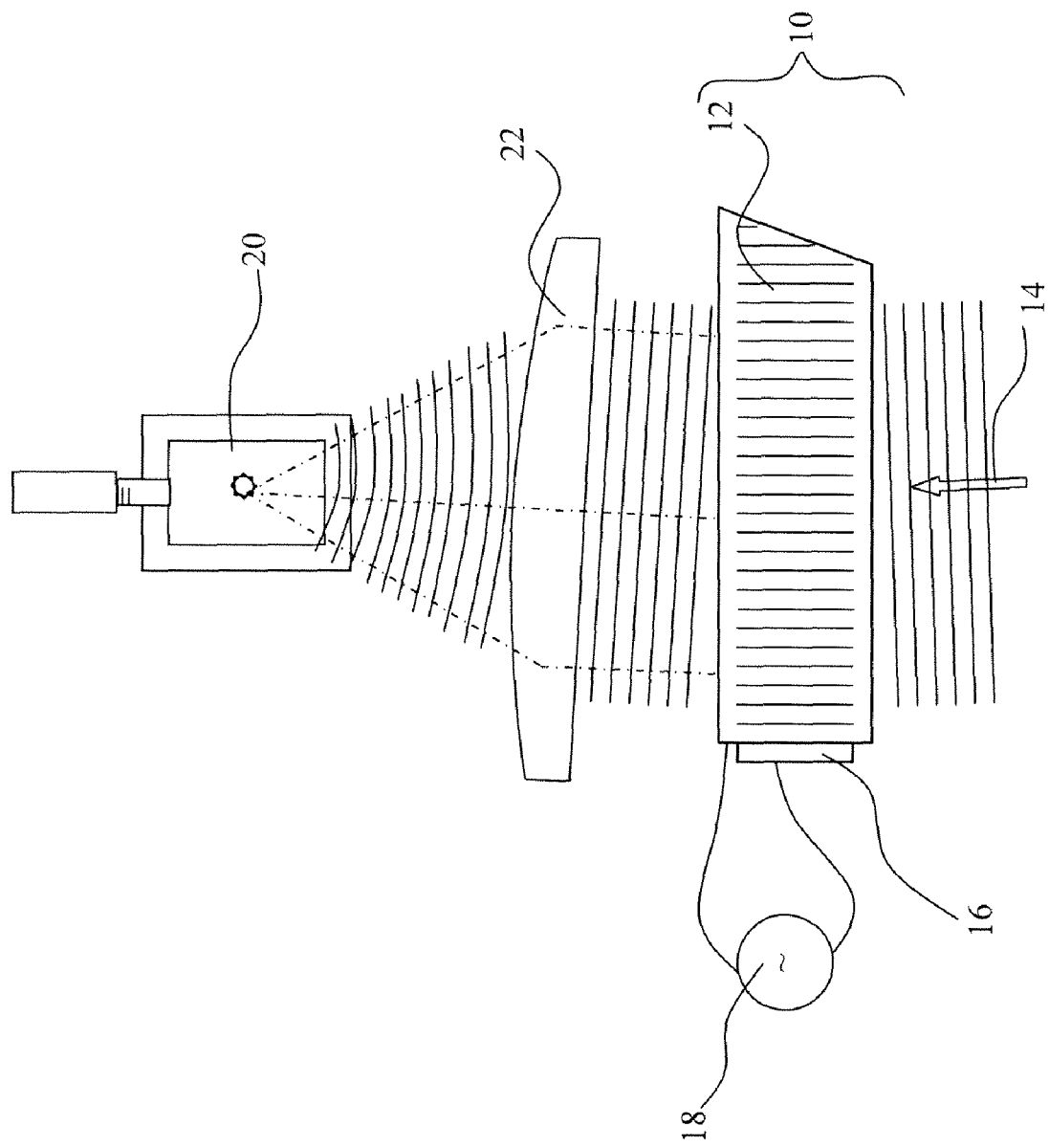
FIG. 1 illustrates one embodiment of an acousto-optic deflector of the present invention that includes a body of material through which a laser beam to be modulated passes.

In one embodiment of the present invention, illustrated in FIG. 1, an acousto-optic deflector 10 includes a body of material 12 through which a laser beam 14 to be modulated passes. In one embodiment, the body of material is made of α-Al2O$_3$ As a non-limiting example, the material 12 can have an acoustic attenuation in the range of 0.15 to 1.0 dB/µs-GHz$^2$ and operates in a UV range of about 150 to 400 nm. In another embodiment, the acoustic attenuation is in the range of 0.2 to 0.25 db/µs-GHz$^2$.

A transducer 16 is bonded to the body of material 12 to launch a wave. An electronic driver 18 drives the transducer 16.

A mechanical stage 20 is provided for holding an article. Suitable articles include but are not limited to a substrate and the like.

One or more optical elements 22 are provided that receive an output of the deflector 10 and transform angular scanning into positional translation.

In another embodiment, the deflector 10 has a cell 24 made of α-Al2O$_3$ through which the laser beam 14 to be deflected passes. As a non-limiting example, the cell 24 has a time bandwidth exceeding 500. In various embodiments, the cell 24 has a time bandwidth that exceeds, 1000, 2000 and the like. As non-limiting examples, the cell 24 can have an acoustic attenuation in the range of 0.15 to 1.0 dB/µs-GHz$^2$, 0.2 to 0.25 db/µs-GHz$^2$, and the like. The cell 24 can operate in a UV range of about 150 to 400 nm.

In this embodiment, the optical elements 22 receive the output of the deflector 10 and transform angular scanning into positional translation, and can be positioned between the deflector and the object to be scanned to provide for scanning in one orthogonal direction.

In another embodiment, the cell 24 is made of α-Al2O$_3$ and can have diffraction efficiencies exceeding: 50%, 60%, 70%, 80% and the like. In this embodiment, optical elements 22 convert angular scan into positional translation. Additionally, the optical elements 22 provide a fast access time to move from one position to another position. As a non-limiting example, the access time can be in the range of 5 ns to 100 ns.

Figure 2:
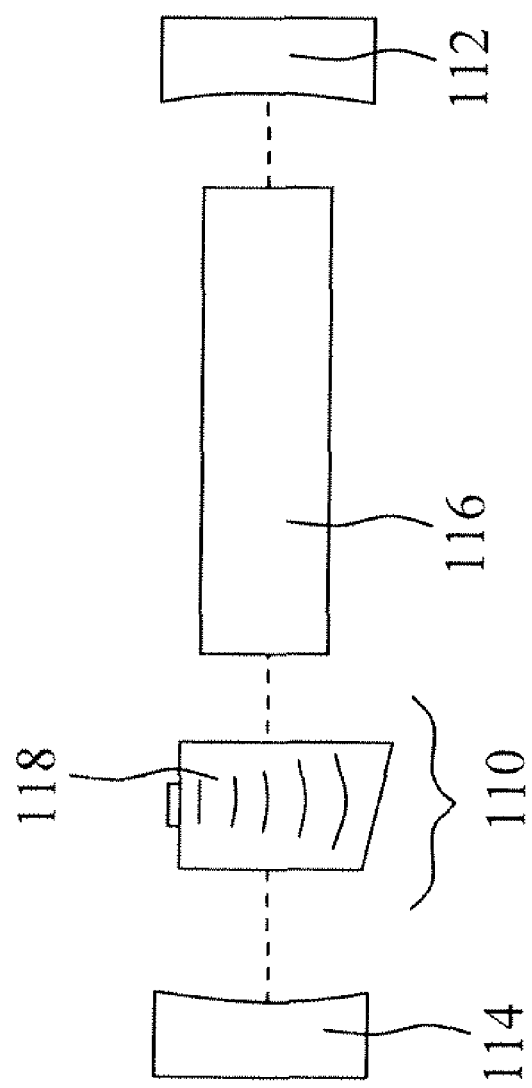
FIG. 2 illustrates one embodiment of a Q-switch modulated laser device of the present invention.
Figure 3:
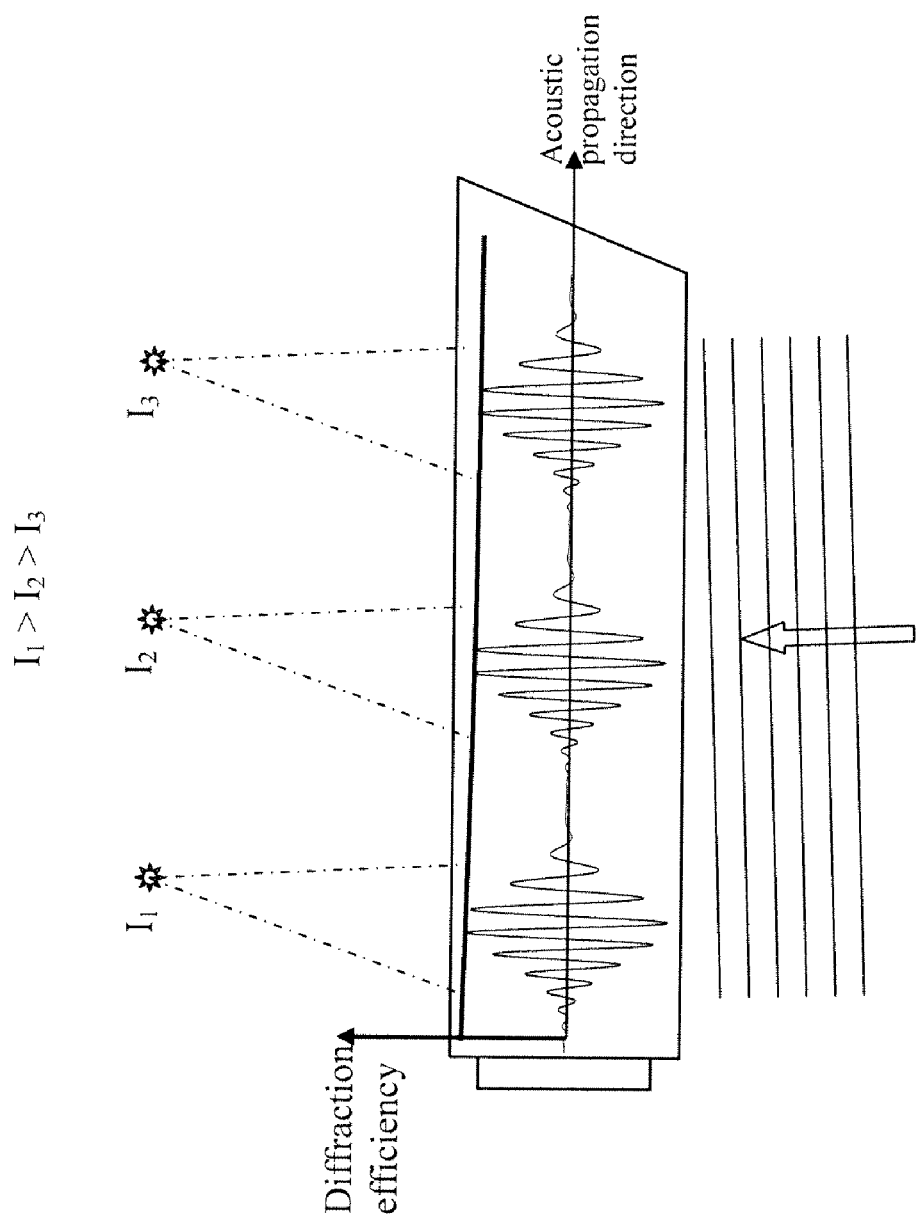
FIG. 3 illustrates the relationship of light intensity (I) relative to diffraction efficiency and acoustic propagation direction.

In another embodiment, illustrated in FIG. 2, a Q-switch modulated laser device 110 is provided and includes an output coupler 112 and a reflector 114 that define a resonator cavity 116 with a gain medium 118 positioned in the resonator cavity 116. A Q-switch 118 is made of α-Al2O$_3$ FIG. 3 illustrates the relationship of light intensity (I) relative to diffraction efficiency and acoustic propagation direction.

In various embodiments, the output of the deflector 10 can used for a variety oat least one of, high speed lithography, wafer inspection, mask inspection, treating a semiconductor and on a flat panel display

EXAMPLE 1

The acousto-optic deflector 10 can be used in high speed lithography. A laser is adjusted with optics for an output of approximately 0.4 watt in the ultraviolet (UV) range. The laser beam is passed through the acousto-optical deflector 10 of the present invention. The acousto-optical deflector 10 deflects the beam when a high frequency signal is applied to the modulator. An un-deflected beam is stopped by a plate positioned approximately one meter from acousto-optical modulator, while a deflected beam passes through the aperture to a beam expander which expands the laser beam in accordance with the diffraction limits to achieve a desired eight micron focused laser spot. A UV-grade aluminum coated mirror is used to deflect the expanded beam into proper alignment with a galvanometer driven scanner.

The scanner can have a nine millimeter diameter scanning mirror and an internal sensor that can be coupled with a servo-amplifier for accurate positioning. The scanned beam is focused with a plano-convex lens that has a focal length of one hundred millimeters onto a substrate. A CID camera has a microscope objective mounted to observe the area on substrate where the laser beam is focused. The substrate is placed on a precision x-y table which is positioned by precision screws and attached to separate motors.

A computer manages the dataflow in the adaptive lithography system. Control electronics control the motion of x-y table and are connected to the computer by an input/output board. An interface board interfaces with the high speed processor with computer. The high speed processor is used to generate bit map patterns from artwork stored in vector form and to process image data from the CID camera. The CID camera is connected to a video subsystem which drives a display and communicates with the computer. The position of the scanning mirror is accurately determined with the use of an alignment laser. The alignment laser emits a beam which is deflected by the scanning mirror and passed through a graticule. The beam is then focused by a lens onto a PIN diode detector.

EXAMPLE 2

The acousto-optic deflector 10 can be used in wafer inspection.

A beam from a laser is directed towards pre-deflector optics which consists of a half wave-plate, a spatial filter and several cylindrical lenses, in order to produce an elliptical beam with a desired polarization that is compatible with the acousto-optical deflector 10 of the present invention. Pre-deflector optics expand the beam to obtain the appropriate numerical aperture. Post-deflector optics includes several cylindrical lenses and an air slit. The beam is brought into focus on a wafer surface and scanned along the direction, in the plane of the wafer surface that is perpendicular to the optical axis of the beam. The wafer surface may be smooth or patterned.

The beam has a wavelength of 488 nm and is produced by an Argon ion laser. The optical axis of the beam is directed onto the wafer surface at an angle, THETA. THETA is in the range of 55-85 degrees with respect to the normal to the wafer surface depending on the application. The scanning means includes the acousto-optic deflector 10 and the translation stage upon which the wafer rests. The position of the wafer on the stage is maintained in any convenient manner, e.g., vacuum suction. The stage moves to partition the surface into striped regions with the acousto-optic deflector 10 moving the beam across the width of the striped regions.

The grazing angle of the beam produces an elliptical spot on the wafer surface, having a major axis perpendicular to the scan line. The acousto-optical deflector 10 scans the spot across a short scan line equal in length to the width of striped region to produce specularly reflected and scattered light. The spot is scanned in the direction indicated, as the stage moves the wafer perpendicular to the scan line. The scan path has an effective start location and the spot moves until is reaches the border of the striped region. Upon reaching the border, the spot and the stage moves perpendicular to the scan direction and the spot assumes a new start position and moves parallel to the scan line. The acousto-optical deflector 10 continues to scan the spot in this fashion along the entire length of striped region. Upon completion of the scan of striped region, the stage moves the wafer to permit the scanning of the adjacent striped region. The effective start location is positioned so that the stage moves perpendicular to each scan line in a direction opposite to that when scanning the striped region. Moving the stage to scan adjacent striped regions in opposite directions substantially reduces the amount of mechanical movement of the stage while increasing the number of wafers scanned per hour.

Light scattered from the wafer surface is detected by a plurality of detectors, including a plurality of collector channels. The optical axis of each collection channel is positioned at an angle of elevation in the range of 70-90 degrees, with respect to the normal to the surface.

EXAMPLE 3

The acousto-optic deflector 10 is used in mask inspection.

In this example, a system is positioned at a vision station and includes a controlled source of laser light, a modulator and an optical feedback circuit. An acousto-optic deflector 10 of the present invention is included as are beam shaping and focusing optics in the form of various lens elements that produce a telecentric, flat field scan by projecting a series of laser beams at the reflective surface of a mask.

The laser signal can be encoded so as to allow separate signal processing functions to be performed during "on" and "off" intervals.

The acousto-optic deflector 10 produces both a scanning beam and a "DC" beam which is normally blocked with a spatial filter. This DC beam can contain about 30% of the laser power. By sensing the variations in this beam it is possible to infer the variations in the illumination.

The DC beam is sensed by a photodetector. The resulting electrical signal is used by an automatic gain control circuit to attenuate or amplify the RF power applied to the acousto-optic deflector 10 at a balanced mixer. The resulting intensity distribution is flat to about 1% which provides a significant advantage for greyscale inspection and a modest dynamic range improvement for 3-D inspection.

A reduction lens is placed directly behind the mask. The mask is located at one focal length from the receiver lens and functions as a telecentric stop to provide a spatial and polarization filtering plane. The mask can form a rectangular aperture (i.e. spatial filter) positioned at an intermediate spatial filtering plane to reject background noise (i.e. stray light) which arises from secondary reflections from objects outside of the desired instantaneous field of view of the system 10. The mask may be a fixed aperture 46 or electromechanical shutter, a liquid crystal, binary, spatial light modulator or valve which is dynamically reconfigured under software control. Such a configuration is useful for inspection of very shiny objects (reflowed solder, wire bond, loops, pin grids, etc.) which are in close proximity from which multiple reflections will be created. Consequently, both the angle (through stop size) and polarization of the input light can be digitally controlled prior to delivery to a detector.

EXAMPLE 4

The acousto-optic deflector 10 is used in treating a semiconductor.

Fabrication of integrated circuits, ICs (integrated circuits) often incur defects for various reasons. For that reason, IC devices are usually designed to include redundant circuit elements, such as spare rows and columns of memory cells in semiconductor memory devices, e.g., a DRAM (dynamic random access memory), an SRAM (static random access memory), or an embedded memory. Such devices are also designed to include particular laser-severable links between electrical contacts of the redundant circuit elements. Such links can be removed, for example, to disconnect a defective memory cell and to substitute a replacement redundant cell. Links may also be removed for identification, configuration and voltage adjustment. Similar techniques are also used to sever links in order to program or configure logic products, such as gate arrays or ASICs (application-specific integrated circuits). After an IC has been fabricated, its circuit elements are tested for defects, and the locations of defects may be recorded in a database. Combined with positional information regarding the layout of the IC and the location of its circuit elements, a laser-based link processing system can be employed to remove selected links so as to make the IC useful.

Laser-severable links are typically about 0.5-1 micrometers thick, about 0.5-1 micrometers, and about 8 micrometers in length. Circuit elements in an IC, and thus links between those elements, are typically arranged in a regular geometric arrangement, such as in regular rows. In a typical row of links, the center-to-center pitch between adjacent links is about 2-3 micrometers.

One or more laser beams are used to selectively irradiate selected laser-severable links. An acousto-optic deflector 10 of the present invention, to move the laser beam to selectively irradiate the selected structures.

Expected variations or differences in the results are contemplated in accordance with the objects and practices of the present invention. It is intended, therefore, that the invention be defined by the scope of the claims which follow and that such claims be interpreted as broadly as is reasonable.

The invention claimed is:

1. An acousto-optic deflector, comprising:
a body of material through which a laser beam to be modulated passes, the material having an acoustic attenuation in the range of 0.15 to 1.0 dB/μs-GHz$^2$ and operates in a UV range of about 150 to 400 nm;
a transducer bonded to the body of material to launch a wave; and
an electronic driver to drive the transducer.

2. The deflector of claim 1, wherein the acoustic attenuation is in the range of 0.2 to 0.25 db/μs-GHz$^2$.

3. The deflector of claim 1, wherein the body of material is made of α-Al2O$_3$.

4. The deflector of claim 1, further comprising:
a mechanical stage for holding an article.

5. The deflector of claim 4, wherein the article is a substrate.

6. The deflector of claim 4, further comprising:
one or more optical elements that receive an output of the deflector and transform angular scanning into positional translation.

7. An acousto-optic deflector, comprising:
a cell made of α-Al2O$_3$ through which a laser beam to be deflected passes, the cell having a time bandwidth exceeding 500, the cell having an acoustic attenuation in the range of 0.15 to 1.0 db/μ-GHz$^2$ and operates in a UV range of about 150 to 400 nm;
a transducer bonded to the cell to launch a wave; and
an electronic driver to drive the transducer.

8. The deflector of claim 7, wherein the cell has a time bandwidth exceeding 1000.

9. The deflector of claim 7, wherein the cell has a time bandwidth exceeding 2000.

10. The deflector of claim 7, wherein the acoustic attenuation is in the range of 0.2 to 0.25 db/μs-GHz$^2$.

11. The deflector of claim 7, further comprising:
a mechanical stage for holding an article.

12. The deflector of claim 11, wherein the article is a substrate.

13. The deflector of claim 11, further comprising:
one or more optical elements that receive an output of the deflector and transform angular scanning into positional translation.

14. The deflector of claim 13, further comprising:
one or more optical elements positioned between the deflector and an object to be scanned to provide for scanning in one orthogonal direction.

15. An acousto-optic deflector, comprising:
a cell made of α-Al2O$_3$ through which a laser beam to be deflected passes an having a diffraction efficiency exceeding 50%, the cell having an acoustic attenuation In the range of 0.15 to 1.0 db/μs-GHz$^2$ and operates in a UV range of about 150 to 400 nm;
a transducer bonded to the cell to launch a wave; and
an electronic driver to drive the transducer.

16. The deflector of claim 15, wherein the cell has a diffraction efficiency exceeding 60%.

17. The deflector of claim 15, wherein the cell has a diffraction efficiency exceeding 70%.

18. The deflector of claim 15, wherein the cell has a diffraction efficiency exceeding 80%.

19. The deflector of claim 15, wherein the cell has a time bandwidth exceeding 500.

20. The deflector of claim 15, wherein the cell has a time bandwidth exceeding 1000.

21. The deflector of claim 15, wherein the acoustic attenuation is in the range of 0.2 to 0.25 db/lμs-GHz$^2$.

22. The deflector of claim 15, further comprising:
a mechanical stage for holding an article.

23. The deflector of claim 22, wherein the article is a substrate.

24. The deflector of claim 22, further comprising:
One or more optical elements that convert angular scan into positional translation.

25. The deflector of claim 24, wherein the one or more optical elements provide a fast access time to move from one position to another position.

26. The deflector of claim 25, wherein the access time is in the range of 5 ns to 100 ns.

27. The deflector of claims 1, wherein an output of the deflector is used for at least one of, high speed lithography, wafer inspection, mask inspection, treating a semiconductor and on a flat panel display.

* * * * *